United States Patent [19]

McCalley et al.

[11] Patent Number: 5,119,188
[45] Date of Patent: Jun. 2, 1992

[54] DIGITAL AUDIO-VIDEO PRESENTATION DISPLAY SYSTEM

[75] Inventors: Karl W. McCalley, South Barrington, Ill.; Richard McNorgan, London; Allan E. Lodberg, Byron, both of Canada; Steven D. Wilson, Chicago; James L. Fischer, Barrington, both of Ill.

[73] Assignee: Telaction Corporation, Schaumburg, Ill.

[21] Appl. No.: 579,238

[22] Filed: Sep. 4, 1990

Related U.S. Application Data

[63] Continuation of Ser. No. 455,836, Dec. 15, 1989, abandoned, which is a continuation of Ser. No. 262,451, Oct. 25, 1988, abandoned.

[51] Int. Cl.⁵ .............................................. H04N 7/10
[52] U.S. Cl. .......................................... 358/86; 455/4.1
[58] Field of Search ................... 358/85, 86; 455/4, 5; 360/9.1

[56] References Cited

U.S. PATENT DOCUMENTS

| | | | |
|---|---|---|---|
| 4,295,154 | 10/1981 | Hata et al. | 358/86 X |
| 4,450,477 | 5/1984 | Lovett | 358/86 |
| 4,450,481 | 5/1984 | Dickinson | 358/86 X |
| 4,734,764 | 3/1988 | Pocock et al. | 358/86 |
| 4,780,758 | 10/1988 | Lin et al. | 358/86 |
| 4,792,849 | 12/1988 | McCalley et al. | 358/86 |
| 4,829,372 | 5/1989 | McCalley et al. | 358/86 |

Primary Examiner—Jin F. Ng
Assistant Examiner—Stella L. Woo

[57] ABSTRACT

An audio-video presentation display system based on manipulation of digitized information is disclosed for use in an interactive communications system wherein a subscriber may select for viewing on a television screen a plurality of audio-video presentations consisting of particular sequences of selected video frames and accompanying audio information. The audio-video presentation display system is responsive to commands from a host computer which designates and prepares the presentation for playback to the television of the subscriber who has requested it. The audio-video presentation display system includes a digital mass storage subsystem which provides for digital storage of compressed video and digitized audio information, and a plurality of digital audio-video display subsystems which include mechanisms for retrieving the selected digitized information from the storage subsystem, a subsystem for expanding and reformatting the data into a format suitable for television transmission, and another subsystem for controlling the transmission of the information to the subscriber who has requested it.

16 Claims, 12 Drawing Sheets

DIGITAL AUDIO-VIDEO PRESENTATION DISPLAY SYSTEM

This is a continuation of co-pending application Ser. No. 455,836 filed on Dec. 15, 1989, itself a continuation of Ser. No. 262,451, filed Oct. 25, 1988, both now abandoned.

FIELD OF THE INVENTION

The present invention relates to an interactive home shopping system which can deliver to a subscriber particular television video frames depicting shopping items of interest which the subscriber has requested, along with an accompanying audio message. The system permits a shopper, in the comfort of his home, to browse through an "electronic mall" of different shops, obtain detailed information on particular items, and make purchases. More particularly, this invention relates to and describes a digital audio video presentation display system for use in an interactive home shopping system, in which all the necessary video and audio information is stored in digital form, and wherein the information is further manipulated in digital form to provide the proper timing which ensures that the shopping presentation is transmitted to a particular subscriber in the appropriate time sequence.

BACKGROUND OF THE INVENTION

Home shopping by use of the television has been growing in popularity in recent years. Generally, home shopping channels are transmitted on a community antenna television (CATV) facility. The CATV facility, which has the capacity for transmitting a multiplicity of commercial and public television signals, is usually connected to a large number of homes via coaxial cable. In most of the home shopping systems being offered to date, subscribers passively view the home shopping channel, watch items and pricing being presented by television sales people, and if interested in any particular item, can place an order over the telephone with a sales person. These systems are non-interactive, in the sense that a viewer can only passively watch items as they are presented on the television screen, but cannot control the course of the shopping presentation.

A more advanced interactive home shopping system has been designed and implemented, in which viewers are able to request particular items to be presented for display and can control the shopping presentation as they proceed. A system of this sort is described in U.S. Pat. No. 4,734,764, entitled "Cable Television System Selectively Distributing Pre-recorded Video and Audio Messages". This prior art invention describes a system which conveys still-frame television-quality video with overlaid graphics information and an appropriate audio message (when desired), to a multiplicity of CATV subscribers who tune to a particular cable channel. The subscriber, by use of a Touch Tone telephone, transmits particular codes in response to message prompts which are displayed in menu form on the TV screen, and requests video displays and information on specific products, as well as make purchases. The user of this system requires no additional equipment other than a Touch-Tone telephone and a television.

In order to interactively operate this type of home shopping system, a subscriber tunes to the CATV channel which is being used for transmission, and dials a telephone number to access the system. Each subscriber is given a particular identification number upon subscribing to the service. When this identifying number is entered via the telephone Touch-Tone keypad, the system recognizes the subscriber and his location Based upon succeeding codes which are displayed on the television screen, and which the subscriber enters on the Touch Tone keypad, his television screen begins to display still frame video, having overlaid graphics where appropriate, and possibly accompanied by a sound track to present information which he has requested on an item. Graphic overlays depicting menus and directories of the "electronic stores" which are on the system are also displayed, and by responding to these menus with a sequence of Touch-Tone commands, the subscriber may browse through a particular store of his choice (e.g. a particular aisle in a supermarket), select a particular product of interest, make purchases or request additional information or help in response to prompts on the television screen.

This interactive home shopping system uses a CATV cable network to transmit the video presentations and accompanying audio messages as requested by subscribers. In conventional video transmission, video frames are transmitted at the rate of 30 frames per second (the North American or Japanese standard), or 25 frames per second (the European standard). A video frame is an interleaved composition of two video fields, with each video-field being further composed of a plurality of scan lines referred to as the "vertical blanking interval, and a larger plurality of scan lines which contains the video image information. The interactive home shopping system described in U.S. Pat. No. 4,734,764 makes use of the vertical blanking interval (which consist of the first 21 lines of the video field) to store information which identifies the particular subscriber to whom the requested video and audio data will be sent and his location. The control center of the CATV system (the CATV headend) transmits the video and audio data with this addressing information in the vertical blanking interval down the main "trunk" coaxial cables of the system. In order to compensate for signal losses which naturally occur down the transmission line, most CATV cable systems incorporate amplifiers at strategic locations called "nodes", which are downstream from the control center. At each node an amplifier amplifies the signals from the control center, and transmits the amplified signals down a plurality of secondary distribution cables. Each of the secondary distribution cables is generally provided with a plurality of tertiary distribution cables known as "taps", and finally each of these taps is further split into a plurality of "drop" cables which terminate at the subscriber's home.

In order to accommodate a large number of concurrent subscribers, the interactive shopping system described in U.S. Pat. No. 4,734,764 utilizes a device known as a frame store unit typically located at each node of the distribution system. Each frame store unit services a small number of cable drops, and functions to capture the video frame that is destined for a subscriber whose particular ID code, encoded in the vertical blanking interval, is associated with the unit. Thus, a frame store unit captures video frames having a particular address encoded in the vertical blanking interval of the frame and stores the video information of that frame into its memory. The video frame store then replays the stored video information 30 times per second (according to the U.S. National Television Standards Committee (NTSC) requirement), and transmits the video along with any accompanying audio message to the particular subscriber that it is servicing.

In the prior art system of U.S. Pat. No. 4,734,764, which has been briefly described above, the video and audio data which comprise a particular presentation offering by a merchant, must first be processed and encoded onto conventional laser video discs. A plurality of conventional video disc players at the central system site transmit the appropriate video and audio information in analog form, under control of a central processing unit. This information is then time multiplexed in the proper sequence, and appropriately modulated and frequency converted for transmission down the CATV cable channel.

Numerous problems and limitations are associated with this type of "analog" video display system. First, a large number of video disc players are required, making the cost and physical size of the electronics for the interactive home shopping system exorbitant. Second, the response time between a subscriber keying in a particular code on the telephone keypad and the appearance of a display in response to that code is too slow to provide for a comfortable interactive session. The response time in the analog system is limited by the time it takes for the video disc player to access a particular frame which can be on the order of three seconds. The slow response time is compounded by the graphics overlay process, in which a graphics decoder receives the graphics information that is associated with a particular video frame from the central processing unit, generates the appropriate graphics display data and routes this data to a video combiner, which receives the video frame from the video player and overlays the graphics information onto the video frame.

Further, in the prior art analog system, the audio information is stored on the video disc in the electronic format of the video frame. This imposes a maximum limit of ten seconds for the duration of the audio portion associated with a particular frame. In many cases, this time limitation is too restrictive for practical use.

An additional limitation arises from the use of a laser disc as the storage medium for the video and audio data. A merchant who desires to put a particular presentation for his business onto the interactive home shopping system of the prior art must undertake a lengthy premastering procedure, required to convert his original material (possibly in the format of catalog photographs, video tape information, etc.) into a format which is encoded onto a video disc master. Multiple copies of the master disc must then be made so that each video disc player in the system can have access to the information when it is called upon to deliver a particular frame to a requesting subscriber. This premastering and duplication process is a time-consuming, linear and batch-oriented procedure which provides no mechanism for making minor modifications at a later date Thus, no reusable archiving is possible. If changes are required, a new video disc must be mastered and reproduced.

Finally, the prior art system has general problems which are fundamentally related to storing and copying data in analog form. Analog signals are more prone to degradation by noise sources that arise in any electronic system Further, the maximum signal to noise of the video signals which are attainable at the output of a video disc player is several orders of magnitude below the noise figure for studio quality video broadcast. Degradation of analog signals as they are transmitted down the long lengths of coaxial line which comprises the CATV system is inevitable. This further degrades the video image seen by the subscriber.

SUMMARY OF THE INVENTION

It is the objective of the present invention to provide for a digital audio video presentation display system as part of a new and improved interactive communications system for merchandising products and services to subscribers.

It is a further object of the present invention to overcome the deficiencies of the analog display system used in the prior art .system described above, by providing a digital audio-video display system which utilizes a different conceptual approach, but which is embodied in a system of hardware and software that is nevertheless downward compatible with the overall home shopping system, as practiced by the prior art U.S. Pat. No. 4,734,764.

It is another object of the digital audio-video presentation display system of the present invention, to maintain and process the video and audio signals in a digital format, thereby providing for more accurate reproduction of the original signals.

It is yet another object of this invention to provide for a digital audio video presentation display system which is considerably more cost effective and of physically smaller size than the prior art analog video display system.

It is still another object of the invention to provide for a digital audio-video presentation display system having markedly decreased response time to a subscriber's input, when compared to the prior art analog system, and which does not impose severe constraints on the length of audio information which can be transmitted along with the video data.

Another object of this invention is to provide for a digital audio-video presentation display system which obviates the need for a cumbersome premastering procedure, as is required in the prior art analog system to prepare masters of video discs which carry the appropriate commercial presentations designed by merchants, and which does not require the making of a plurality of copies of these master discs.

It is another object of this invention to provide for a digital audio video presentation display system which has an innovative digital mass storage subsystem for storage and retrieval of video and audio data, which can be shared easily among a plurality of digital audio-video display subsystems as described further herein, and which provides for a reusable archiving capability.

It is an additional object of this invention to provide a novel encoding technique for storing large amounts of data in the digital mass storage subsystem which permits rapid retrieval of a particular set of data from the large database of information stored on the digital mass storage subsystem.

The present invention is directed to a digital audio-video presentation display system which can be used in conjunction with other elements of an interactive shopping system which allows a subscriber to choose a shopping presentation comprising particular items for display and purchase by keying in codes on a standard Touch Tone telephone keypad as prompted by menus, graphics, and audio which are presented on the television screen. The digital audio-video presentation display system of the present invention comprises a digital mass storage subsystem for storing compressed audio and video data, and one or more digital audio-video display subsystems. Each of these digital audio-video display subsystems includes means for retrieving compressed data which corresponds to the selected audio and video presentation from the digital mass storage subsystem, means for expanding and reformatting the video data into a format compatible for television transmission, means for transforming and modulating the audio data onto appropriate television carrier frequencies, and means for performing the transmission of the audio and video data in proper sequence to a requesting subscriber.

BRIEF DESCRIPTION OF THE DRAWINGS

For a fuller understanding of the nature and objects of the invention, reference should be made to the following detailed description, as illustrated in the accompanying drawings wherein.

DETAILED DESCRIPTION OF THE INVENTION

Figure 1:
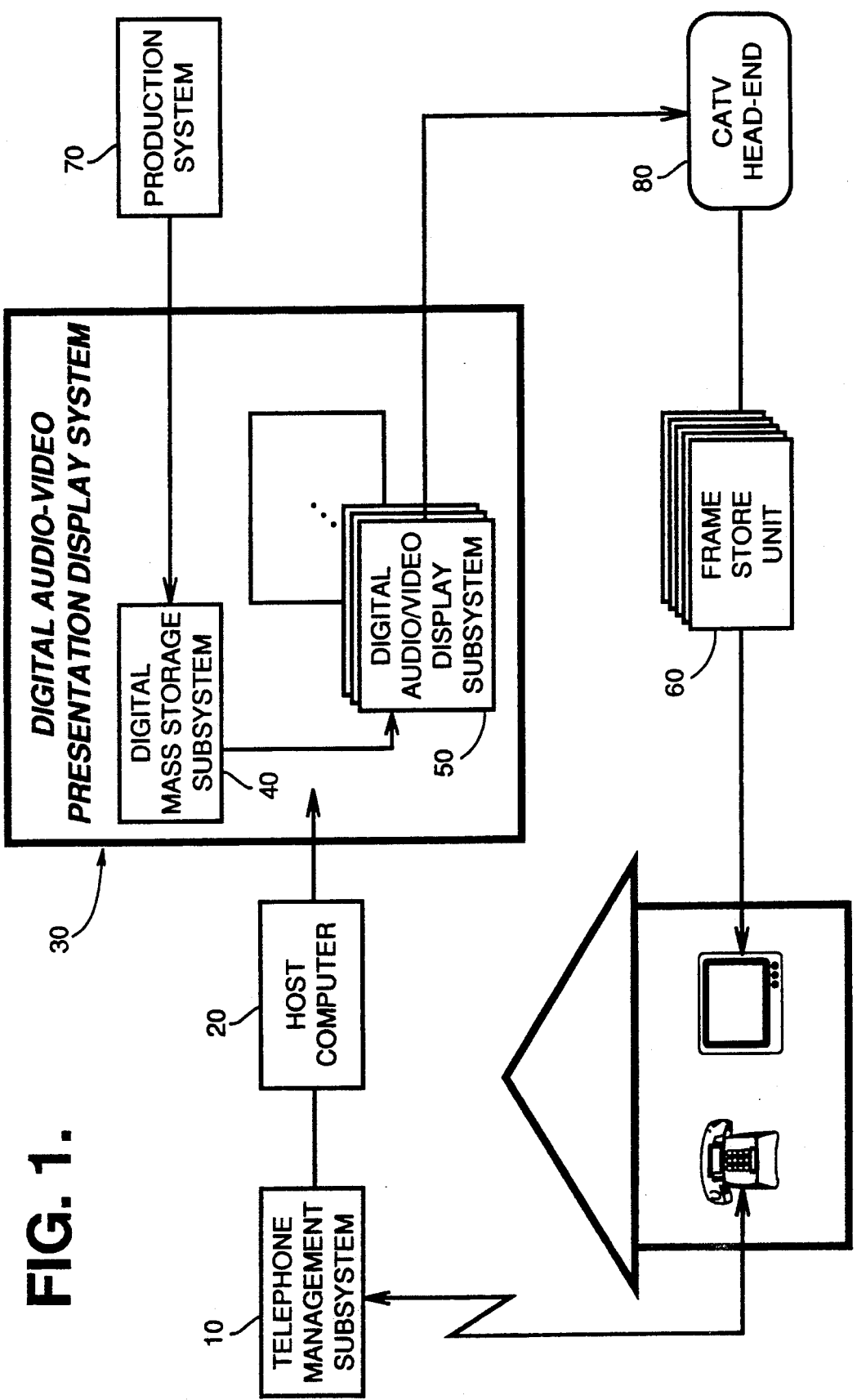
FIG. 1 is block diagram of the overall home shopping system which illustrates the major functional components of the system.

With reference to FIG. 1, the digital audio-video presentation display system is shown in its relationship to the other major elements of the overall interactive home shopping system. At least one telephone management subsystem 10 (TMS) is present in the overall system to receive telephone requests from the subscribers (in the form of Touch Tone signals) and to relay those requests to the central processing unit of the host computer 20, which in a preferred embodiment is a Tandem VLX mainframe system. The digital audio-video presentation display system 30 comprises a digital mass storage subsystem 40 (DMSS) which holds the database of digitized and compressed video and audio presentations, and at least one digital audio-video display subsystem 50 (DAVDS). A preferred embodiment of the digital audio video display system 30 uses seven active digital audio-video display subsystems each one of which is capable of servicing approximately 200 concurrent subscribers. The overall system is protected by a single independent DAVDS. This DAVDS, when requested by the host computer, can replace any one of the seven active DAVDS which may suffer a failure or a reduced performance condition. The overall interactive shopping system incorporates the use of both on-line and off-line measurement techniques to ensure that failures which may cause the system degradation or reduced performance, are rapidly detected.

The output of the digital audio-video display system 30 is transmitted to the CATV headend 80, and then down the CATV cable lines where it is intercepted by the particular frame store unit 60 (FSU) which services the particular subscriber. The frame store unit 60 replays the video frame at an appropriate rate to provide a still-video image, along with any accompanying audio, of selected items in the presentation. A production system 70 is interfaced to DMSS 40. The production system 70 is used by merchants to prepare their commercial presentations, which are then stored in DMSS 40.

DEFINITIONS

It is helpful at this point to define some of the terminology that is used in this disclosure, and which relates particularly to the presently preferred embodiment of the digital audio video presentation display system.

1. Segment: This is a series of audio frames (usually 0-4 followed by a series of video frames (usually 0-7).
2. Presentation: A presentation consists of a series of segments, as initially set up and defined by the merchant.
3. Script: A script is a data structure generally of several hundred to several thousand bytes in length, which contains information that defines the time sequence for the display of audio and video images within a presentation. The script also contains information as to what kind of data (e.g. video or audio) is contained within the frame, as well as overlay graphics information.
4. Data Object: A data object is a generic term for any string of data. The object string generally includes structural information about itself.

THE DIGITAL MASS STORAGE SUBSYSTEM

The Digital Mass Storage Subsystem (DMSS) comprises the database of digitized/compressed video and audio presentations.

As such, it is a repository for a plurality of large data objects, each of which contains a compressed video image or a portion of digitized audio. The objects range in size from about 200 bytes up to about 100,000 bytes. The average size is about 40,000 bytes. The DMSS, in a preferred embodiment, can accommodate 1,000,000 such objects (each individually named), can accept "retrieve" commands for individual objects by name and deliver the named object within 80 milliseconds. Additionally, it can accommodate seven active digital audio-video display subsystems (DAVDS) and one spare DAVDS, and provide a bandwidth for delivering objects to any one DAVDS of 4 megabytes/second. When an object is requested by a DAVDS which is not present in the DMSS, it can be fetched automatically through a gateway device to an archival version of the digital mass storage subsystem which contains a backup copy of all data objects. The DMSS can accept commands through the gateway to either delete or store data objects. Further, when traffic demands can not be satisfied instantaneously, the DMSS provides for queuing of commands to be serviced on a priority basis.

In order to meet these requirements, a set of up to eight standard, Multibus II chassis are provided in a preferred embodiment. Multibus II is an "open system" bus architecture which is commonly used by many people in the computer industry. The actual number of chassis required by the system depends upon the number of data objects which need to be contained. Each chassis is populated with 19 identical, single board computers (SBCs) of the Intel 386/100 class, each SBC having two industry standard Small Computer System Interface (SCSI) ports and built in diagnostics. The functions of the SBCs, as described more fully below, provide for disc volume management, object location, gateway connection, inter-chassis communication, and communication with each DAVDS. Test and future expansion slots are also available. The hardware layout of a preferred embodiment of the DMSS is depicted in FIG. 2, which shows the configuration and functions of a standard chassis.

Figure 3:
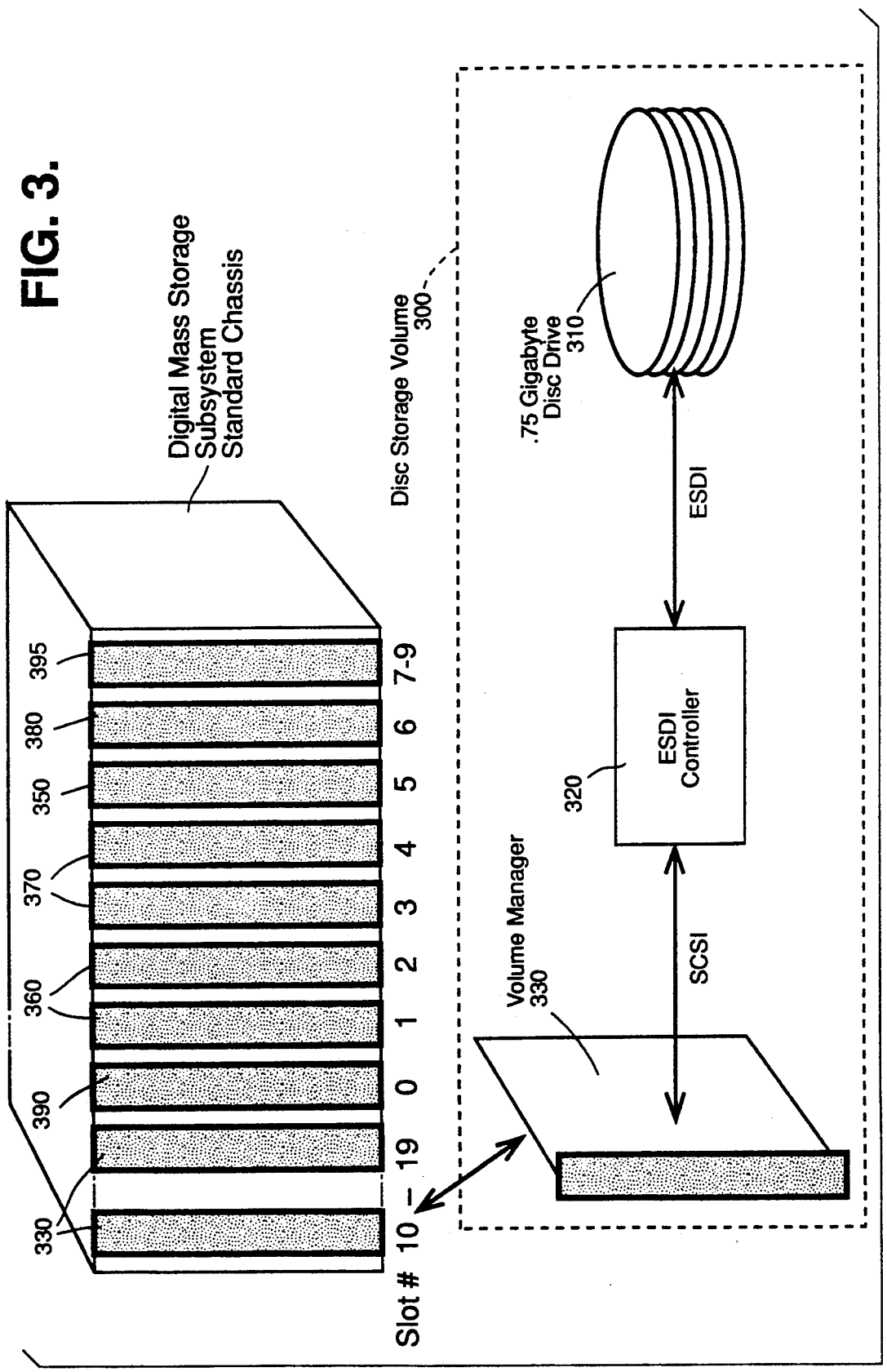
FIG. 3 illustrates the disc storage volume, which is the building block of the digital mass storage subsystem.

The basic building block of the DMSS is called a "disc storage volume". Data objects are stored on the disc storage volumes. A disc storage volume 300, as illustrated in FIG. 3, comprises a disc drive unit 310 such as the Maxtor 760 megabyte unit, a controller 320 for the disc drive unit connected to the drive via an industry standard Enhanced Small Disc Interface (ESDI) interface, and a single board computer (SBC) which acts as the disc storage volume manager 330, and which is connected to the controller via a SCSI interface.

Figure 2:
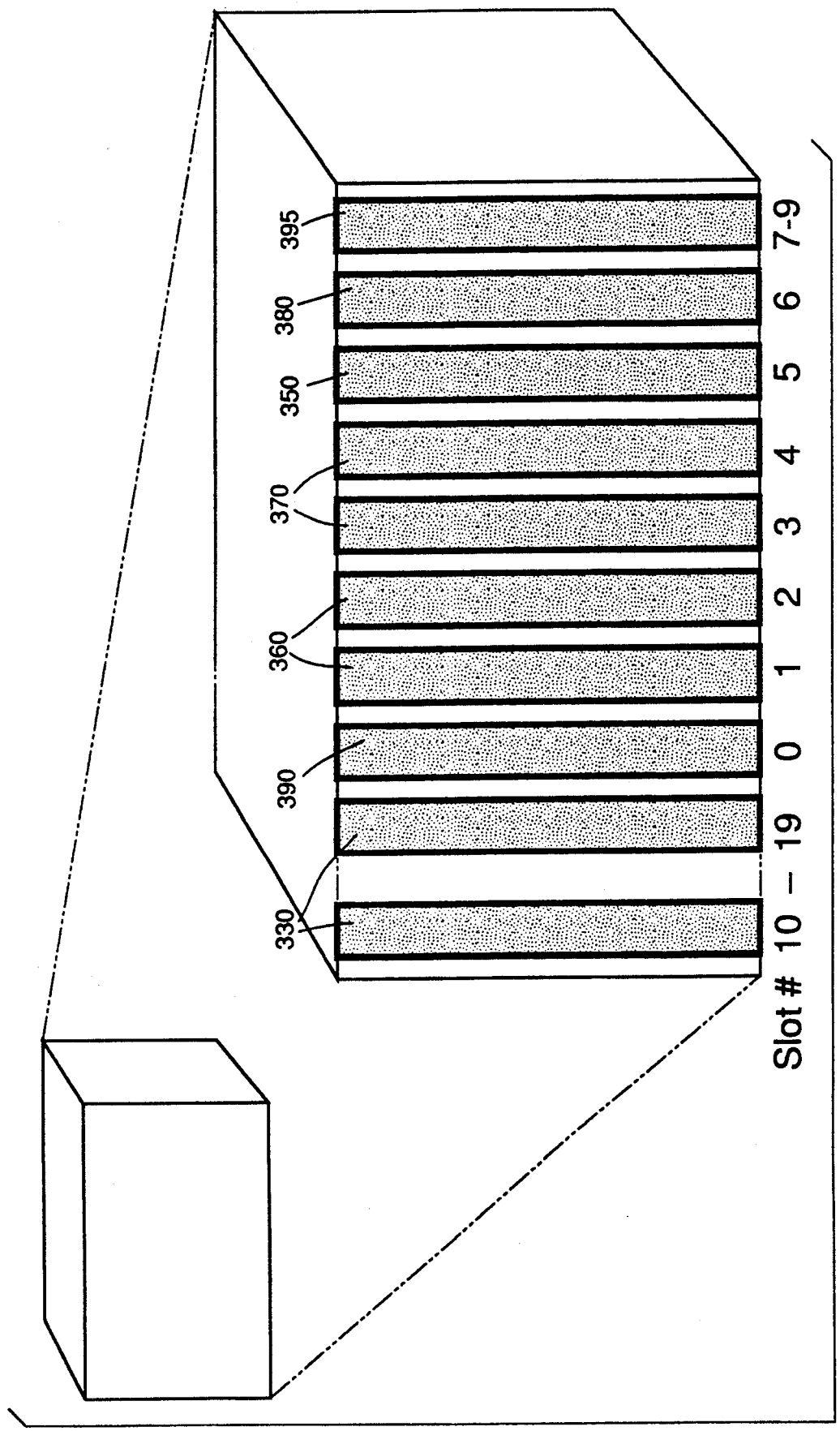
FIG. 2 shows the configuration and functions of the digital mass storage subsystem chassis.

With reference to FIG. 2, the single board computers (SBCs) on board each chassis provide different software functions to the system. The disc storage volume managers 330, of which there may be up to ten on a chassis, have the function of storing, retrieving, and deleting data objects. Each disc storage volume manager 330 also stores a record of the object name index of its associated disc storage volume for recovery purposes. A volume manager 330 also sends messages to each of the object locator modules 350 (OLMs), reporting its own slot and chassis number, and describing the data groups which it contains. The interchassis communication modules 360 (ICCMs) route messages which are received from the Multibus II backplane to other chassis of the DMSS over the SCSI ribbon cables and correspondingly route messages which are received over the ribbon cables to the appropriate slots on their chassis. The display system command modules 370 (DSCMs) are connected to the display system controllers of the DAVDS, which are described more fully below, via SCSI interface links. The software function performed by the DSCM 370 is to receive requests for data objects from the display system controllers, and deliver corresponding data objects to the display system controllers for further processing. As shown, the preferred embodiment has two DSCMs 370 per chassis. The display system controllers deliver their requests for a desired data object to the DSCM 370. This message is routed to the onboard object locator module 350 via the Multibus II backplane, or to object locator modules on different chassis via the interchassis communication module 360 (ICCM). The object locator module 350 (OLM) performs a mapping function described with more particularity below, which determines the data storage volume where the data object resides, and transmits a retrieval message to that volume requesting that the particular data object be sent to the digital audio-video display subsystem (DAVDS). The gateway module 380 imports and exports data objects and messages upon command from other digital mass storage devices, or from object locator modules 350. Additionally, each chassis contains a central services module 390 (CSM) which performs housekeeping functions for the chassis and which is a required component in a Multibus II application system. Test equipment and additional expansion slots 395 are also available on each chassis for development testing and future expansion.

Figure 4:
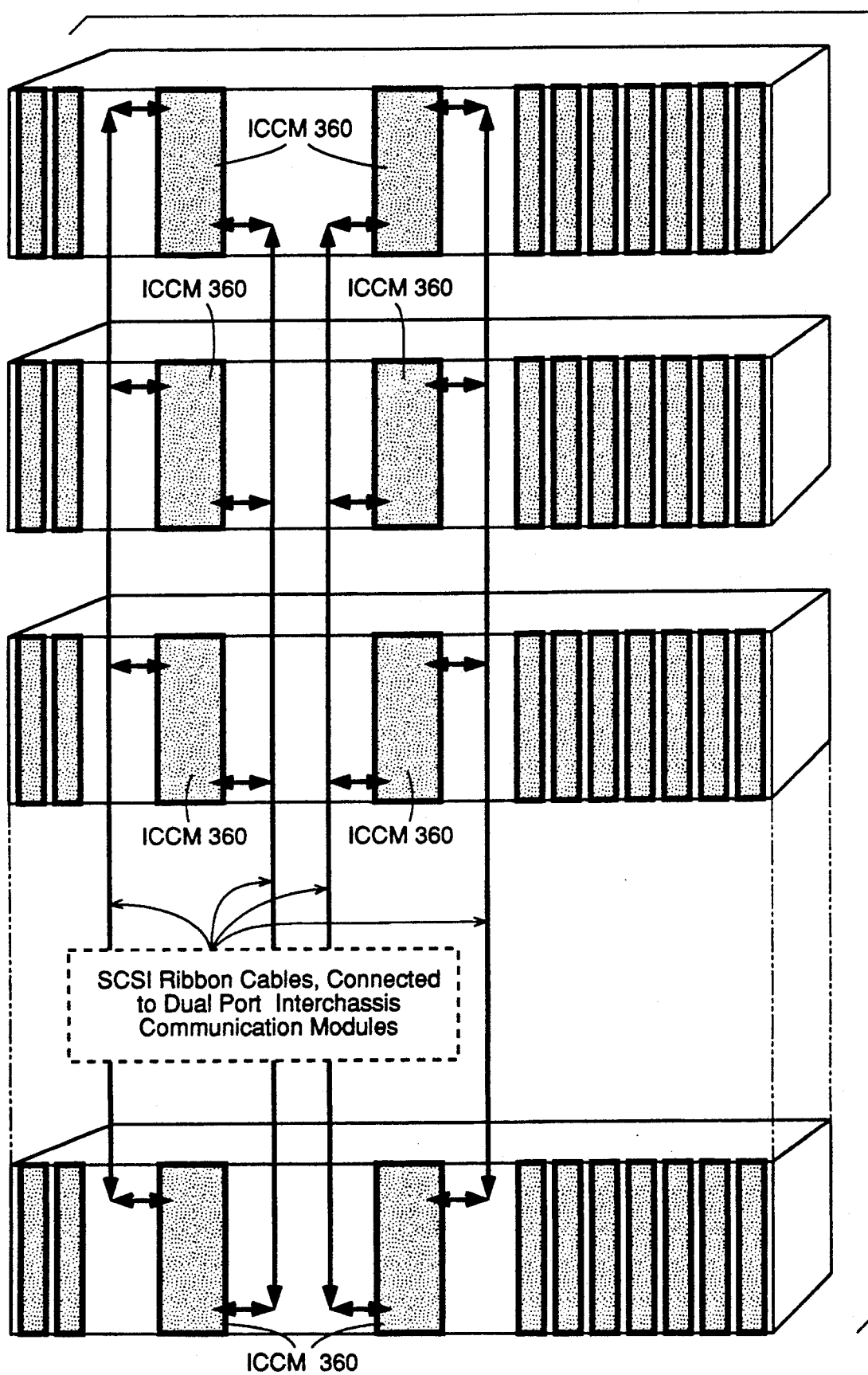
FIG. 4 represents a scheme for connecting the inter-chassis communications modules.

FIG. 4 shows with more particularity the parallel connection pathways for connecting the interchassis communication modules 360 which reside on different chassis to each other. As shown, each of the single board computers which provide the ICCM functionality have dual SCSI interface ports. As illustrated, data and command flow between the chassis is provided by up to four of these SCSI connections per chassis, with each pair of ports from a particular ICCM 360 being connected in parallel fashion to all the other chassis of the system. The parallel pathways and the built-in redundancy ensure that communications between chassis occurs rapidly, even under high system load conditions. The number of such connections which are actually necessary depends upon the number of digital audio-video display systems (DAVDS) that are connected to the DMSS.

Figure 5:
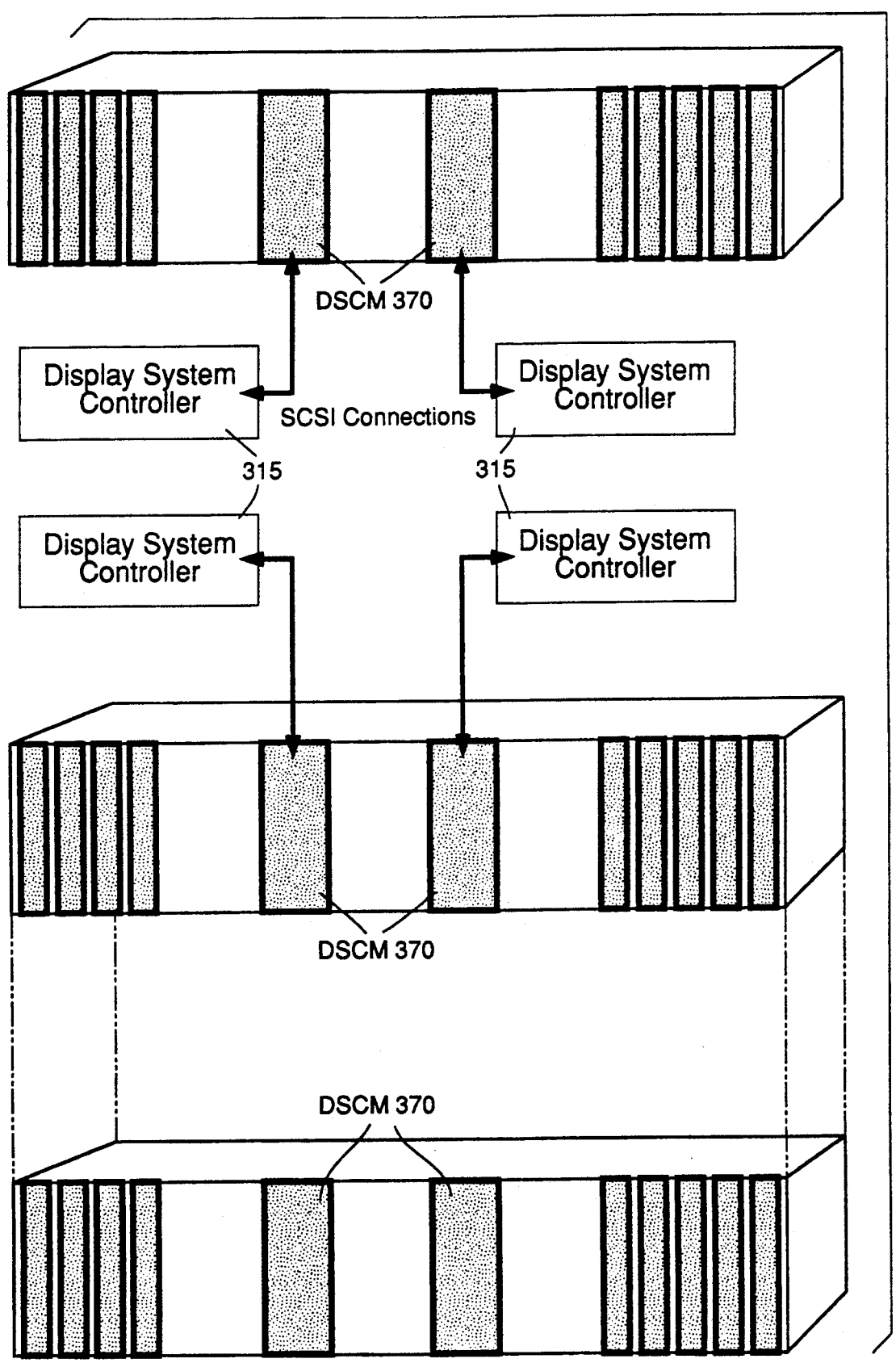
FIG. 5 shows a non-redundant method of connecting the digital audio-video display subsystems to the DMSS chassis.
Figure 6:
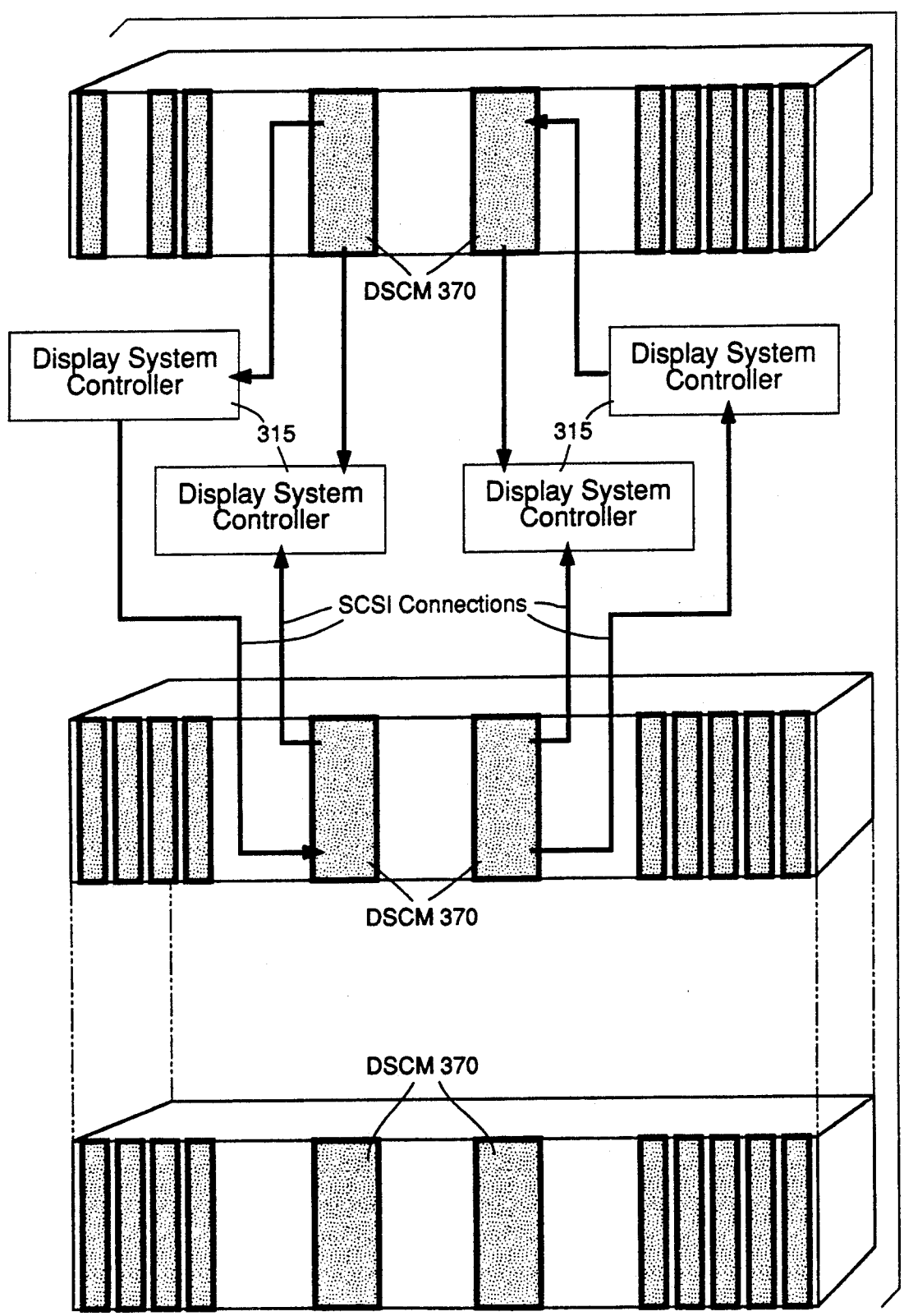
FIG. 6 illustrates a fault-tolerant redundant method of connecting the digital audio video display subsystems to the DMSS chassis.

The display system controllers of each of the digital audio-video display subsystems, which are described more fully below, may be connected with the chassis which comprise the DMSS in the manner shown in FIGS. 5 and 6. The connection arrangement is flexible and may be determined for each installation according to the number of data objects that will be stored and the number of digital audio-video display subsystems which will be needed to service traffic at the operating site. For example, in FIG. 5, a non redundant connection, in which each of the digital display system controllers 315 is connected via a SCSI interface link to a display system control module 370. FIG. 6 shows an alternative embodiment wherein each display system controller 315 is connected to two display system control modules 370, each of which is on a different chassis. In turn, each display system control module is seen to service two display system controllers 315 over its dual port SCSI interface. The redundant connection shown in FIG. 6 may be desirable for fault tolerance purposes and to ensure overall system integrity.

Each data object stored in the DMSS must be given an identifying name. In order to provide the system with sufficient flexibility for name allocation purposes, each object name is stored in a data field which is 20 bytes long. An exceedingly large number of possibilities of names is ($256^{20}$) is thereby provided for.

A novel encoding methodology has been implemented in the DMSS which permits rapid search and access of this potentially large set of data objects. The methodology utilizes the notion that the domain which comprises the large set of distinct data object names may be mapped, by any number of straight-forward algorithms, into a range comprising a much smaller set of numbers. Each member of this smaller set, which is designated as a "data group" is then associated with a particular volume. Since the mapping is not one to one, each data group represents a plurality of distinct data object names. However, since each data group is associated with a particular volume, the volume containing the desired data object may be rapidly accessed. A second stage search within the data volume, which has a lookup table of manageable size containing all the distinct data object names that are stored in the data volume, permits rapid location of the desired named data object. Association of a particular data group with a particular data volume is performed by the object locator module 350 (OLM) in each DMSS standard chassis, which at all times knows how many active data volumes are on the system, and which data volumes provide storage for any data group. In order to distribute objects uniformly throughout the different data volumes, the mapping must be performed in such a way that a small region of the large domain of distinct data object names is mapped uniformly over the complete range comprising the data group set. This is required to ensure that data object names are sufficiently randomized during the mapping process so that they are uniformly distributed over the different active data volumes of the system.

The following example serves to illustrate how such a mapping may be performed to map 20 bytes into 2 bytes (or 16 bits), thereby providing for a total of 65,536 possible data group elements. This example illustrates only one of many ways in which a domain of 20 bytes which represents the totality of possible data object names can be mapped uniformly into a 2 byte range. Data object name formats may differ depending upon the particular type of object being named. In this illustrative example we assume that there are three different kinds of data object names. For example, a name for a presentation data object may have the following format:

PRESENTATION OBJECT NAME:

TTTTCCCCCPPPPPFFFFFF
byte 1 . . . . . . . . . . . . . . . . . . . 20

In this naming scheme, the type of data object is allocated a 4 byte field denoted by "T"s, the client name is allocated a 5 byte field denoted by "C"s, the presentation number is a 5 byte field denoted by "P"s. Similarly, the particular frame number is denoted by the F field and the frame type (audio or video) is denoted by the f field. A name for a subscriber identification data object may have the following format:

SUBSCRIBER ID OBJECT NAME:

TTTTLLLLLLNNNNNNNNNN
byte 1 . . . . . . . . . . . . . . . . . . . 20 in which the "T" field again designates the type of object, the "L" field designates the operating center and the N field designates the subscriber's telephone number. The name for an order data object may be likewise designated as ORDER OBJECT NAME: TTTTTLLLLLNNNNNNNNNN
byte 1 . . . . . . . . . . . . . . . . . . . 20 in which the object type field is again designated by "T"s, the local operating center that has taken the order is designated by the "L" field and the order number is designated by the "N" field.

By appropriately selecting bytes from these different types of data object names which display the most variability, and by performing a series of operations on these bytes which lead to further randomization, one may obtain a two byte range which maps the entire 20 byte domain in a highly uniform manner. For example, it may be determined by analysis of the data object names that the most variable byte in the presentation object name is byte 14 (the lowest order digit of the presentation number), and that similarly the most variable bytes of the data object name which denotes subscriber identification information are the two last digits of the subscriber's telephone number (bytes 19 and 20). Likewise, it may further be determined that bytes 15 and 16 of the object names as number of which designate orders are the most variable. After selecting the most variable bytes (e.g. byte 14 from the presentation object name, bytes 19 and 20 from the subscriber identification object name, and bytes 15 and 16 from the order object name), one can perform a highly randomized mapping of the original 20 bytes into 2 bytes by following a set of rules such as:

1. Concatenate bytes 14, 19, 20, 15 and 16. Bytes 14, 19, 20 may be designated by A and 15 and 16 as B.

14, 19, 20 15, 16
A       B

2. Add B to A, dropping any carry. This leaves a 3 byte result.
3. Add the first 8 bits of the sum (byte 14) to the low order 16 bits, again dropping any carry.

In this manner, a 16 bit (2 byte) number is obtained which by virtue of its construction, is designed to map any section of the domain of the large 20 byte set uniformly over the full range of the much smaller 2 byte set.

In operation, as a particular data object is presented for storage in the DMSS, a mapping function of this type is performed by the object locator module 350 (OLM) which converts the name of the data object into a particular data group of the small range. The OLM 350 allocates a particular data volume for that data group. As other data objects names come into the system, the mapping again forces the same data groups to be stored in the same volume. The full object name is stored in a lookup table at the disc storage volume manager 330 that is associated with each disc drive. Since each disc drive holds at most 20,000 objects, the lookup table of object names in each volume manager 330 is of manageable size.

In order to retrieve a particular data object, the same mapping is performed, which immediately tells the object locator module 350 (OLM) which data volume contains that particular object. Once the volume is accessed, a second stage of the search, which searches the object name in the particular volume's lookup table is then performed to find and retrieve the data object. This two step data allocation and retrieval approach permits a very large data base structure to be searched rapidly. Rapid retrieval of data objects is essential in order to provide acceptable response times for the interactive video display system.

THE DIGITAL AUDIO-VIDEO DISPLAY SUBSYSTEM

Figure 7:
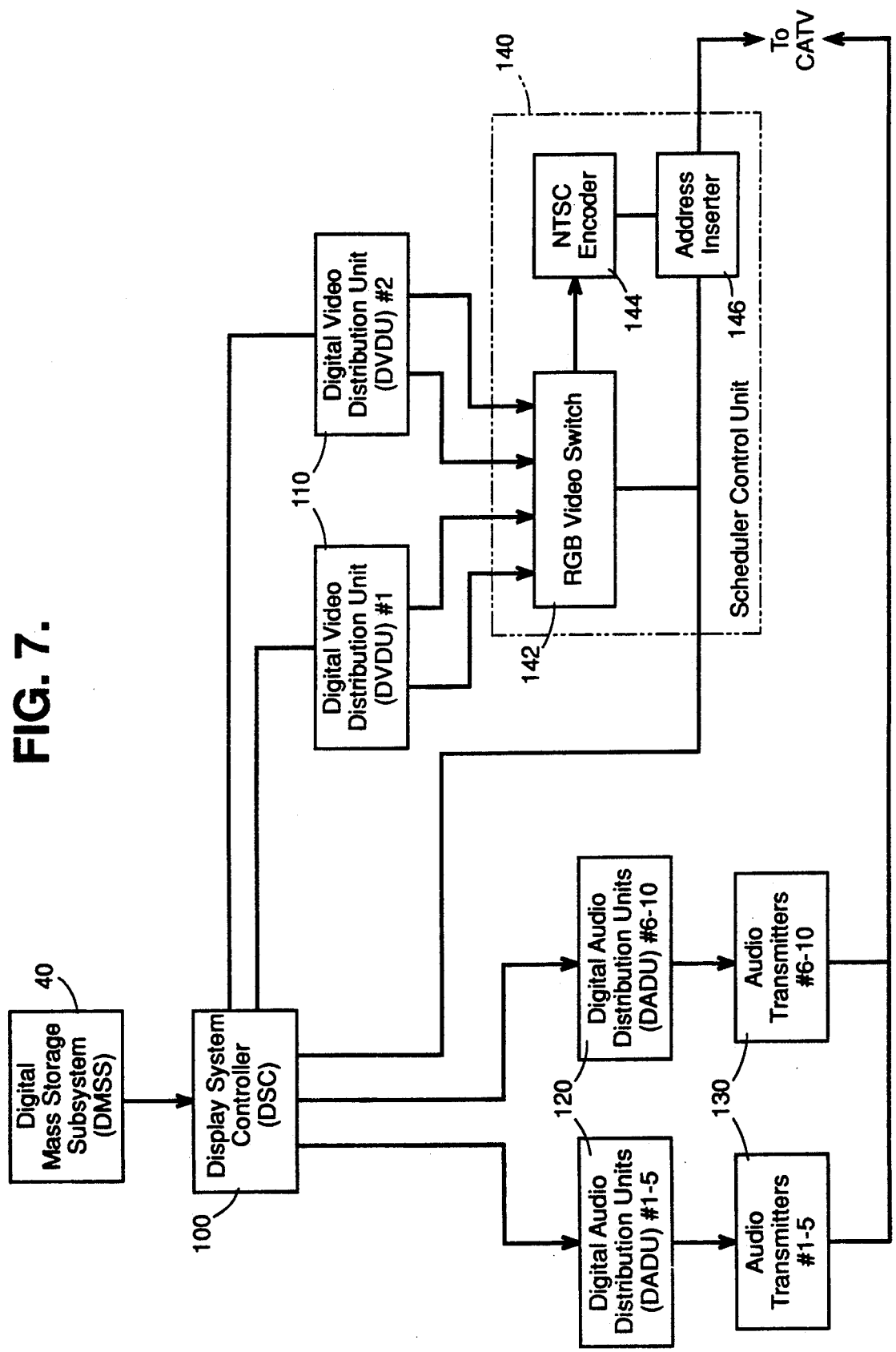
FIG. 7 is block diagram of the major functional components of a digital audio-video display subsystem (DAVDS).

Each digital audio-video display subsystem 50 of FIG. 1 (DAVDS) is comprised of five major units as shown in FIG. 7, which, with reference to that figure, include:

1. A Display System Controller

The display system controller 100 (DSC) coordinates and orders the transfer of data from the DMSS 40 to other components of the DAVDS, such as to the digital audio-video distribution units 110 (DVDU) and the digital audio distribution units 120 (DADU) which are described below. It also maintains the time synchronization of the DVDUs 110 and DADUs 120 to provide minimum response times to the subscriber and to maintain high presentation data transfer rates. The transfer of audio and video data, as well as control and status information to and from the DADUs and DVDUs is done via standard Small Computer System Interface (SCSI) links.

2. A Digital Video Distribution Unit (DVDU)

It is the function of the digital audio-video distribution unit 110 (DVDU) to transform compressed video data into full frames of video in standard RGB format. In a preferred embodiment each DAVDS contains two or three DVDUs. Each DVDU in turn contains two Digital Video Expanders (DVEs). The two DVDUs, working in combination will provide frames at a rate of about 24 per second. This will serve 200 concurrent users at expected consumption rates. Three DVDUs are needed to provide thirty frames per second, the maximum permitted in the NTSC video format.

3. A Digital Audio Distribution Unit (DADU)

The function of the digital audio distribution unit 120 is to transform audio data which comprises the audio program, and which may be in compressed form, into baseband audio, which is then sent to the audio transmitters 130 for modulation onto an audio subcarrier. In a preferred embodiment, there are twenty channels of audio per DADU and ten DADUs per DAVDS. Thus each DAVDS has two hundred independent audio channels for concurrently serving 200 active subscribers.

4. Audio Transmitters

Each of the audio transmitters 130 receive audio signals from the DADU 120 and in a preferred embodiment, modulate these audio signals onto one of five hundred and seventy two discrete frequencies in the 41-46 megahertz band. This frequency range corresponds to the standard intermediate frequency (IF) of a CATV upconverter which further converts the audio for transmission to any standard CATV channel. The typical audio system may thus occupy any four-megahertz channel in the CATV distribution network or alternatively, or two groups of audio channels may be combined into a single six-megahertz channel.

5. Scheduler Control Unit (SCU)

The scheduler control unit 140 (SCU) accepts the RGB outputs from the DVDUs 110 and converts them into the standard NTSC video format (with all required addresses and audio tuning codes included in the vertical blanking interval) for presentation to the CATV headend control center which injects the signals into the CATV transmission network.

A more detailed description of each of these five functional elements of the DAVDS now follows.

1. The Display System Controller (DSC)

Figure 8:
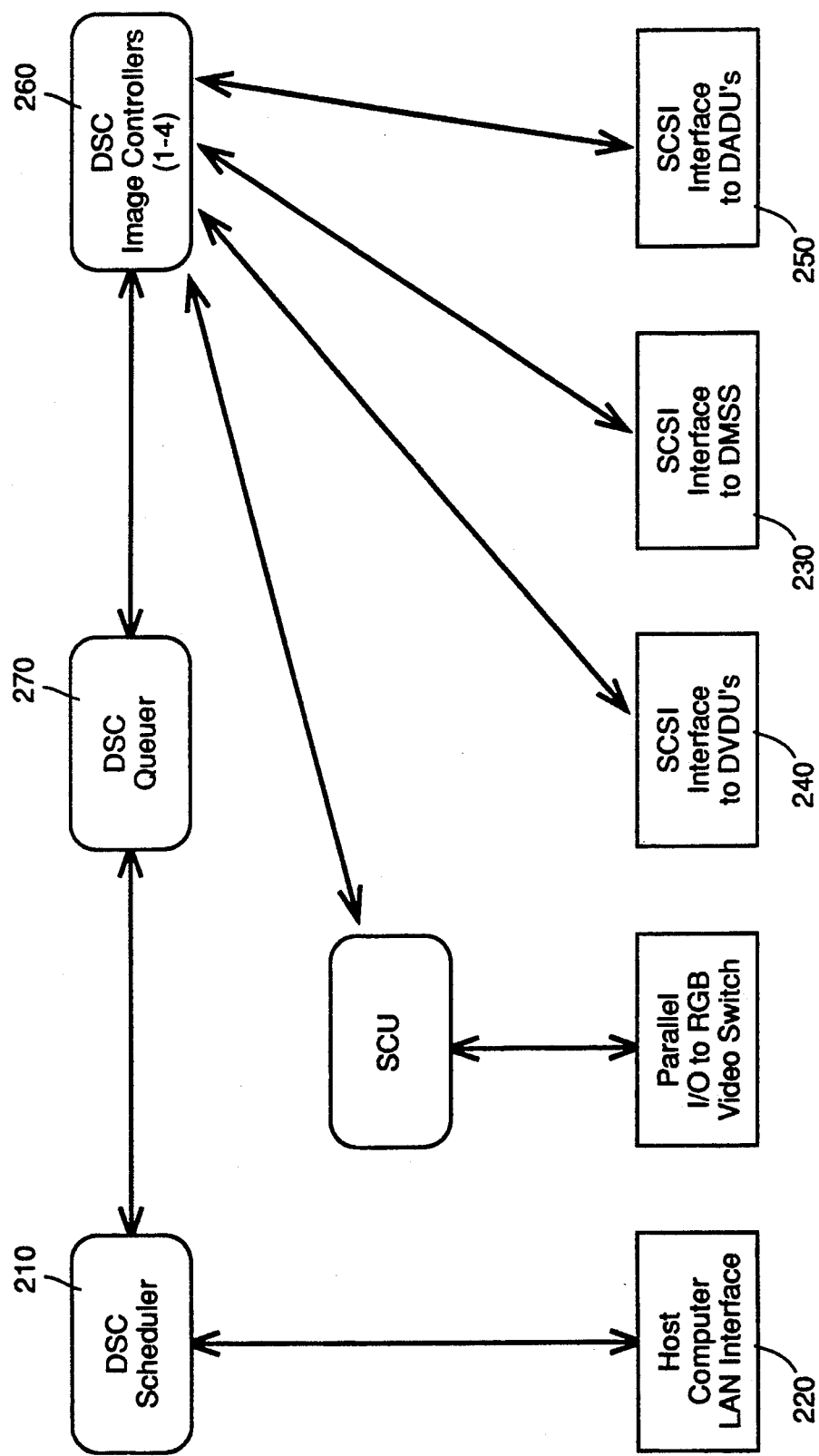
FIG. 8 illustrates the hardware interconnection for the display system controller (DSC).

In a preferred embodiment, the hardware of the DSC 100 is configured in an open system bus structure such as the Multibus II chassis (which includes a twenty slot Multibus II backplane, a central services module, and a power supply). With reference to FIG. 8, a processor board, which in the preferred embodiment is an Intel 186/530 processor functions as the DSC 100 scheduler 210 and receives presentation segment requests from the host computer via its internal local area network interface 220. The processor schedules the presentation requests, and responds to the host computer with status information when the requests are completed.

The function of the DSC 100 is to generate the timing for properly interspersing and collating the video frames for all concurrent subscribers who have shopping sessions in progress (up to approximately 200 per DAVDS). The information which describes the playback of the presentation to the subscriber is contained in "a script", which as defined above, is a data structure of several hundred to several thousand bytes which contains the time sequence information for properly displaying audio and video images within a presentation. Upon capturing the script from the host, the DSC 100 ascertains that the script is played out properly to the particular subscriber who has requested it. Moreover, the DSC 100 properly intersperses the scripts to different subscribers in such a way that timing delays caused by system load conditions are minimized so that the video and audio are presented as closely as possible to what was intended. The script information resides in the presentation database of the host computer. DSC 100 is connected to the DMSS 40 by a plurality of SCSI boards 230. These boards carry the fetch requests to, and return compressed audio and video data from the DMSS 40. Two additional SCSI boards 250 connect DSC 100 to the digital audio distribution units. Control information and audio data, are transmitted from the DSC 100 to the DADUs 120 along this interface, which also functions to return the response information from DADUs 120. Two more SCSI boards 240 connect the DSC 100 to the DVDUs 110. These boards permit the transmission of control information for the text and video data to the digital video display units, and return response information from the video display units back to DSC 100. An additional four Intel 186/100 processor boards, known as DSC image controllers 260 perform supervisory control over the SCSI interfaces which connect DMSS 40, DVDUs 110 and DADUs 120. An additional Intel 186/100 board known as the DSC 100 queuer 270 is provided to allocate requests to, and monitor the loading of the four DSC 100 image controllers 260.

Software Functions Of The DSC

Figure 9:
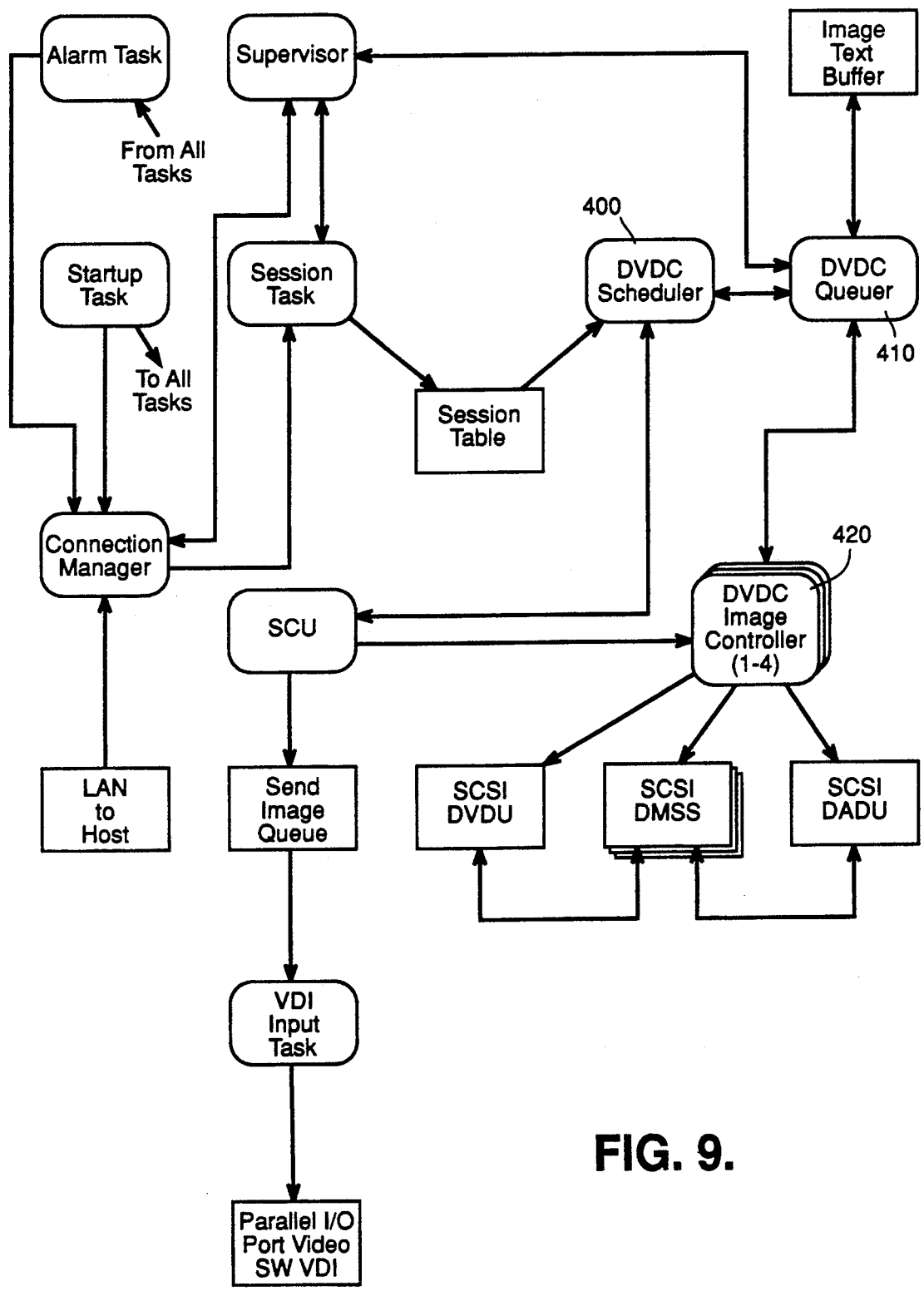
FIG. 9 is a software process diagram representing the major soft tasks implemented in the display system controller (DSC).

In addition to a number of system processes and support processes, application processes are provided in the DSC 100 system which are responsible for processing the segment messages from the host computer. A process flow diagram for the DSC 100 is shown in FIG. 9. With reference to that figure, the major software tasks which are provided in the preferred embodiment of the DSC 100 are briefly described as follows:

A. Scheduler:

As individual steps contained in the script received from the host computer become due, the scheduler 400 sends request messages to the queuer task 410 to initiate the presentation of the image to the appropriate subscriber.

B. Queuer:

The queuer task 410 partitions the requests it receives from the scheduler, and spreads them across the available image controllers 420 in order to achieve and maintain a proper system load balance. The queuer 410 also selects which DVDU will be used to process the request.

C. Image Controller:

This process provides the appropriate command sequences for synchronizing the audio and video generation and the delivery of the data to a subscriber's frame store unit. It monitors the DVDU and the DADU throughput and attempts to initiate the audio part of the presentation as closely a possible to the delivery of the first video frame.

2. The Digital Video Distribution Unit (DVDU)

The function of the digital video distribution unit (DVDU) is to transform compressed frames of video into full frames of video in standard RGB video format so that when requested, these frames can be presented to the scheduler control unit (SCU) 280 for transmission to the cable system.

Figure 10:
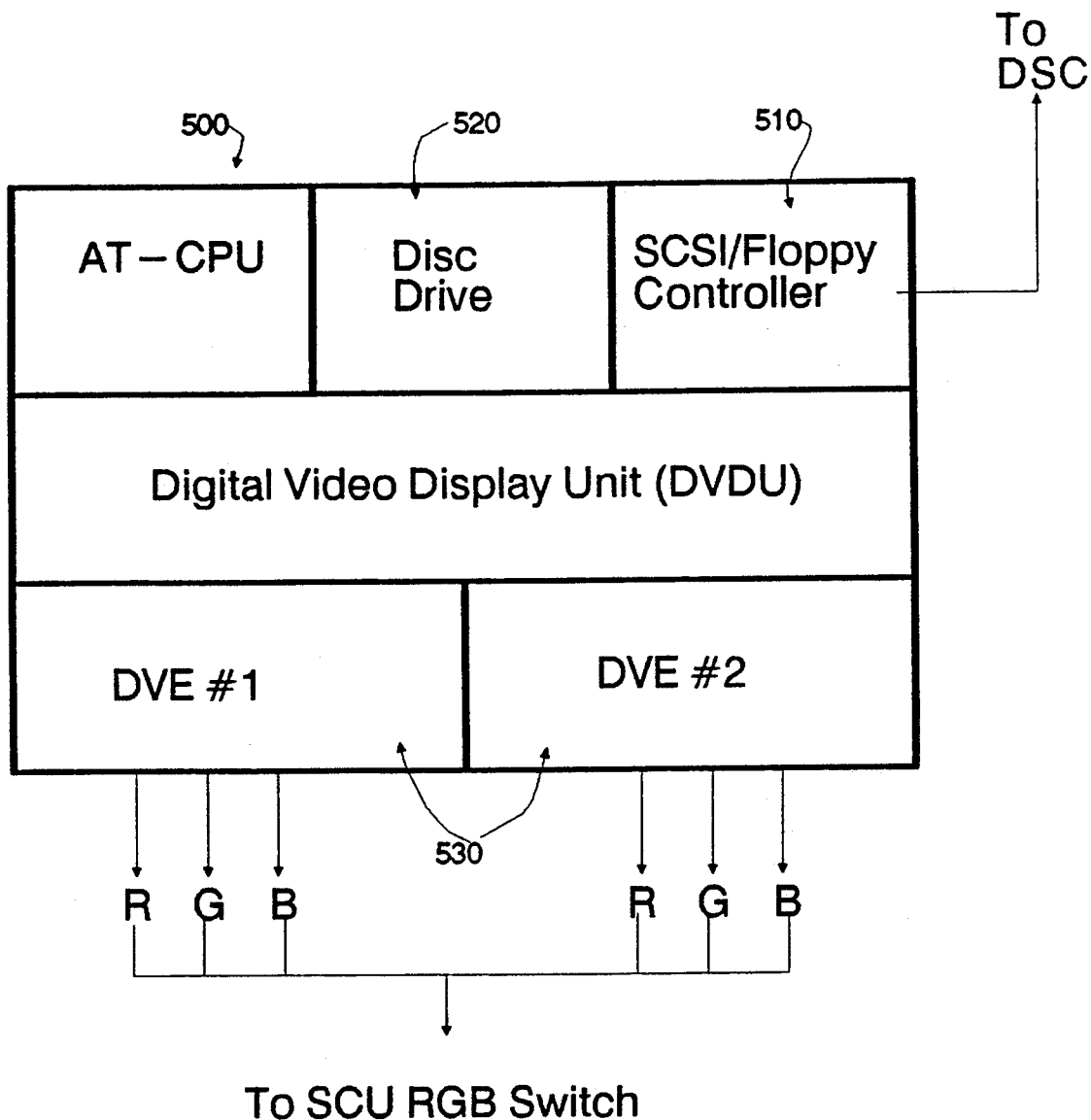
FIG. 10 is a block diagram illustrating the hardware configuration of the digital video distribution unit (DVDU).

In the preferred embodiment, the hardware configuration of the DVDU, as shown in FIG. 10, is contained in a chassis which has a passive IBM PC-AT backplane, an 80386 AT-compatible CPU card with four megabytes of memory 500, a SCSI interface card having an integral floppy disc controller 510, a floppy disc drive 520 and two digital video expander (DVE) units 530. The SCSI interface provides the pathway for receipt of compressed video data and control information and for transmission of status information to the display system controller (DSC 100).

The two digital video expander (DVE) boards 530 each comprise a pair of video processors. Compressed video data is read by the first processor, which produces a block of data in expanded format. The expanded data is then processed by the second processor to produce the video frame in RGB format for subsequent presentation to the scheduler control unit. An additional function of the DVDU which is provided by the second video processor is to produce graphics image overlays of a variety of fonts, having different colors (background and foreground), sizes and other artistic attributes such as drop shadows, and kerning. The graphics data for these image overlays is produced either during the initial set up of the presentation by the merchant, or interactively by the host computer in response to particular requests made by the subscriber during the shopping session. The appropriate scripts for the overlay graphics are stored in the host computer.

The compression of video data is performed at the time of initial presentation encoding by the merchant. The result of this compression is data which represents the original video image and which also contains a set of algorithms which are needed to reconstruct the original image.

Software Functions Of The DVDU

The basic function of the DVDUs 110 is to expand compressed video data, combine it with any associated text/graphics data and deliver RGB formatted video to the video switch of the SCU.

Figure 11:
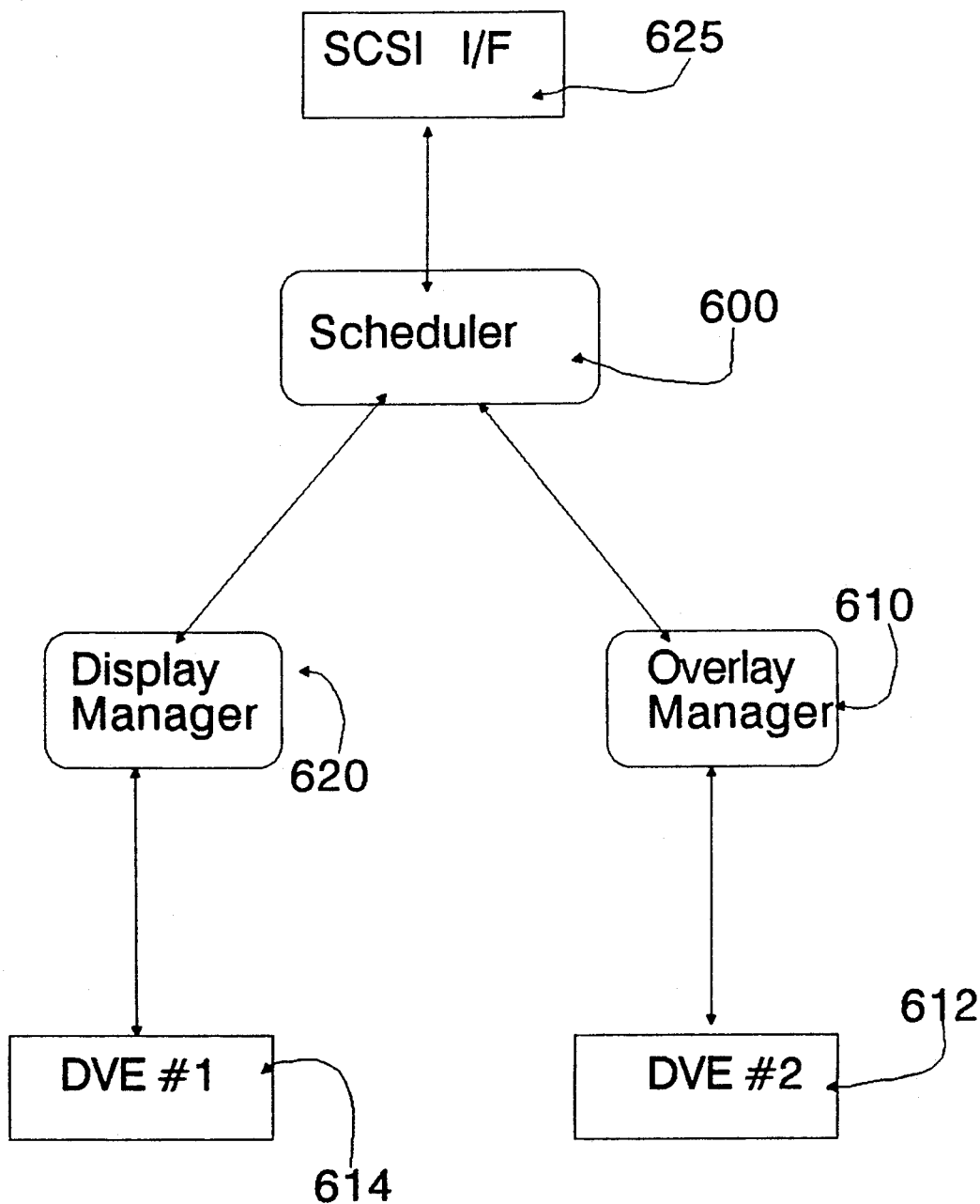
FIG 11 is a process flow diagram illustrating the major software tasks implemented by the digital video distribution unit (DVDU).

The software structure for the DVDU is illustrated in FIG. 11. The three basic tasks required to perform the above functions are briefly described as follows:

A. Scheduler:

The scheduler task 600 provides a communication capability to the DVDU and the DSC 100 via a SCSI interface 625 and also provides for synchronization of the operations within the DVDU.

B. Overlay Manager:

The overlay manager task 610 controls the translation of text/graphics commands into the proper microcode instructions which are acceptable by the second digital video expander 612.

C. Display Management:

The display manager task 620 controls the expansion of the video by digital video expander 614, and its display in response to commands from the DSC 100.

3. The Digital Audio Distribution Unit (DADU)

The digital audio distribution unit transforms the audio data, which may be in compressed format, into original baseband audio form. This is then presented to the transmitters for modulation onto a channel of the CATV cable system.

Figure 12:
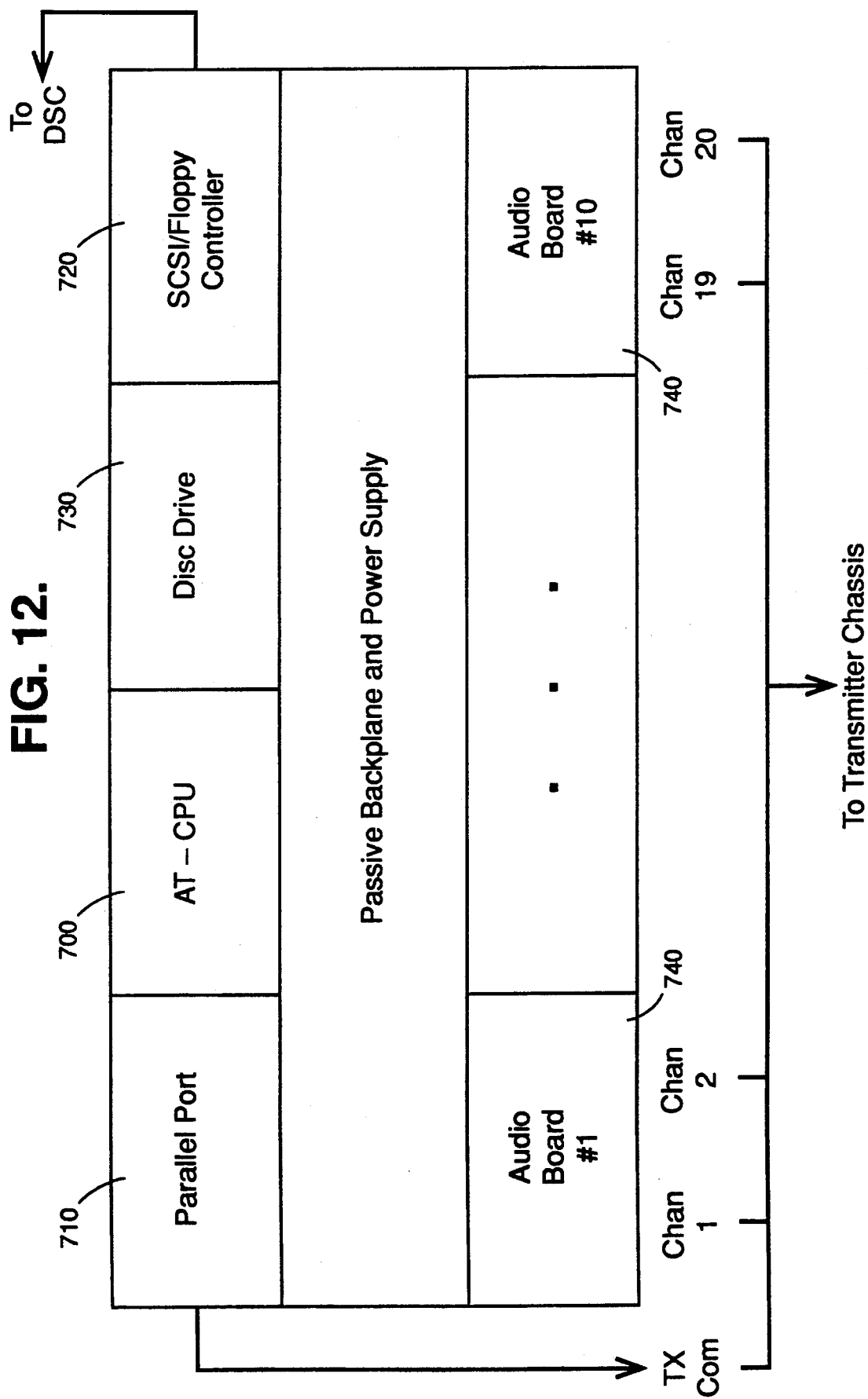
FIG. 12 is a block diagram which illustrates the hardware configuration of the digital audio distribution unit (DADU).

With reference to FIG. 12, the hardware configuration of the DADU in a preferred embodiment is contained in a chassis which has an IBM PC AT backplane, and 80386 AT-compatible CPU card 700 with four megabytes of memory, a parallel interface card 710 which serves as a communications port to the transmitter, a SCSI interface card having an integral floppy disc controller 720, a floppy disc drive 730 and 10 dual-channel audio playback boards 740.

The audio portion of the shopping presentations may be encoded and compressed using an Adaptive Differential-Pulse-Code Modulation (ADPCM) during the initial presentation processing. The ADPCM group of algorithms is widely used and exhibits well characterized behavior. The compressed audio data as well as appropriate control information is transmitted from the DSC 100 along the SCSI interface to the DADU. The parallel interface provides tuning control of the transmitters and monitors their status. The CPU manages the data flow into and out of system memory and ensures that the audio data is routed to the appropriate audio playback circuits. Each of the audio boards contains a digital signal processor with enough buffer memory to provide continuous audio playback while the CPU performs other tasks.

The Software Functions Of The DADU

The DADU software, upon receipt of audio playback requests from the DSC 100, manages the audio data associated with these requests and controls the loading of this data into the audio playback circuits. The DADU software also provides proper interfacing to the audio transmitters. The software includes both utility tasks as well as supervisory tasks. Among the utility tasks, there is a SCSI driver which provides a data path for receiving audio data from the DSC 100 and for properly routing it to a buffer memory from which it is transferred back to the audio boards, a tuner driver which communicates over the parallel port to the DADU to pass signals to the transmitter tuner hardware, and an audio driver which provides the proper protocol for transferring data to and from the audio boards.

The most important of the supervisory tasks is performed by the schedule control program which acts to receive new audio loads from the DSC 100, sets up appropriate audio channels, and tunes the transmitters.

4. The Audio Transmitter

The audio transmitter in the preferred embodiment, consists of 10 dual transmitter cards, an interface card and a power supply mounted in a chassis. It functions to amplitude-modulate up to twenty baseband audio channels which are received from the DADU and then mixes and places them onto a carrier frequency associated with a specified audio IF channel. In particular, in the preferred embodiment, each transmitter card consists of two single transmitters having combined outputs. The audio signal is double-side band amplitude modulated onto a 10.738635 MHz carrier, and this amplitude modulated IF signal is then up converted to the desired CATV channel output frequency by standard mixing techniques.

5. The Scheduler Control Unit

The scheduler control unit 140 (SCU), as shown in FIG. 7, comprises, in a preferred embodiment, an RGB video switch 142, an RGB to NTSC encoder 144 and an address inserter 146. The RGB video switch 142 accepts the multiple RGB outputs from the DVDUs 110 110, and switches these outputs into a signal path which forms the RGB signal stream. The NTSC encoder 144 operates on this signal stream and produces NTSC formatted video output which is passed to the address inserter 146. In countries which do not utilize the NTSC transmission standard, a similar encoder would be utilized to perform the function of producing formatted video output compatible with that country's transmission standard. In particular, systems designed for use in most Western European countries (as well as some South American countries), which utilize the PAL transmission standard would convert the RGB output to the PAL format. Similarly, the RGB signals would be converted to SECAM format in systems designed for use in France and the USSR. In the address inserter, the address of the particular frame store unit and the audio receiver tuning code are inserted into the vertical blanking interval of the frame.

In a preferred embodiment, the SCU hardware is configured within the DSC 100 and communicates, via a number of parallel input/output lines with the address inserter and the RGB switch.

To summarize, a digital audio-video presentation display system (DAVDS) has been disclosed which overcomes the deficiencies present in analog video display systems used in the prior art. The digital audio-video presentation display system disclosed herein comprises a digital mass storage subsystem and a digital audio video display subsystem. A novel method of encoding a large set of object names required by the interactive home shopping system has been presented which permits rapid retrieval of a particular data object from the DMSS 40. Further, both the hardware and software functionalities of the major components of the DAVDS have been described.

Although the invention herein has been described with reference to particular embodiments, it is to be understood that these embodiments are merely illustrative examples of the different aspects of the invention. Thus, it will be apparent to one skilled in the art that numerous modifications may be made to the illustrative embodiments and other arrangements may be devised to implement the invention which do not depart from the spirit and scope of the invention. Such modifications and arrangements are therefore intended to be embraced by the claims presented herein.

What is claimed is:

1. In an interactive communications system compatible with cable television systems wherein a subscriber may select for viewing on a television a plurality of audio video presentations consisting of particular sequences of selected video frames and possibly accompanying audio, a digital audio video presentation display system responsive to commands from a host computer which designates and prepares the presentation for playback to the television of the subscriber requesting the presentation comprising:
  (a) a digital mass storage subsystem for storing compressed video and audio data objects in digital format; and
  (b) at least one digital audio-video display subsystem which includes
    (i) means for retrieving data objects corresponding to each of the selected video frames and accompanying audio information of the requested sequence in digital format from the digital mass storage subsystem upon command from the host computer;
    (ii) means for expanding and reformatting the digital compressed video data into full frames of analog video compatible with television transmission and playback; said means for expanding and reformatting said compressed video data including means for converting and sequencing said video and audio data objects into modulation compatible with said cable television systems
    (iii) means for transforming the digital audio data into analog baseband audio and for modulating the baseband audio onto audio carrier frequencies compatible with television transmission and playback; and
    (iv) means for controlling the transmission of the video frames and accompanying audio information in analog format to the headend of a cable network so that the subscriber requesting the information receives the information in the particular sequence designated by the host computer.

2. The digital audio-video presentation display system of claim 1 wherein the digital audio-video display subsystem further comprises means for encoding identifying information in the vertical blanking interval of the selected video frames.

3. The digital audio-video presentation display system of claim 2 wherein the digital audio-video display subsystem further comprises one or more display system controllers.

4. The digital audio-video presentation display system of claim 3 wherein the digital mass storage subsystem for storing and retrieving data objects of compressed video and audio data in digital format further comprises:
  (a) a plurality of disc storage volumes, each disc storage volume including a disc drive, a disc drive controller, and a single board computer which serves as a disc storage volume manager that provides supervisory control of the disc storage volume;

(b) a plurality of chassis, each chassis housing at least one disc storage volume manager, at least one gateway module for importing and exporting data to and from the digital mass storage subsystem, at least one display system command module for connecting the digital mass storage subsystem to each of the display system controllers which comprise the digital audio video display subsystem, at least one object locator module for determining which disc storage volume is associated with a particular data object, and at least one interchassis communications module for interconnecting and transferring data to and from each of the plurality of chassis.

5. The digital audio video presentation system of claim 4 wherein the plurality of chassis include a central services module in each chassis for providing maintenance functions.

6. The digital mass storage subsystem of claim 4 wherein the disc storage volume managers, the gateway modules, the object locator modules, the display system command modules, and the interchassis communications modules each comprise a single board computer.

7. The digital mass storage subsystem of claim 4 wherein the interchassis communications modules which reside on one chassis are each connected in parallel to corresponding interchassis communications modules on the other chassis of the digital mass storage subsystem.

8. The digital mass storage subsystem of claim 4 wherein a display system command module is individually connected to a display system controller which comprises the digital audio video display subsystem.

9. The digital mass storage subsystem of claim 4 wherein a display system command module is interfaced in a redundant fashion to each of two display system controllers which comprise the digital audio-video display subsystem, and wherein each display system controller is interfaced to two display system command modules, each of which is on a separate chassis of the digital mass subsystem.

10. The digital audio video presentation display system of claim 1 wherein each digital audio video display subsystem further comprises:

(a) at least one digital video distribution unit which includes means for transforming compressed video data in digital format into full frames of video in RGB format;

(b) at least one digital audio distribution unit which includes means for which transforming digital audio data into baseband audio;

(c) at least one display system controller which includes means for coordinating the orderly transfer of data from the digital mass storage subsystem to the digital video distribution units and the digital audio distribution units;

(d) a plurality of audio transmitters which include means for receiving baseband audio signals from the digital audio distribution unit and for modulating these audio signals onto an audio subcarrier having a frequency appropriate for television transmission; and (e) a scheduler control unit including means for accepting the RGB outputs from the digital video distribution units, and for converting the frame into a format compatible with television transmission and playback.

11. The digital audio video display subsystem of claim 10 wherein the scheduler control unit further comprises means for inserting identifying information into the vertical blanking interval of each frame.

12. The digital audio video display subsystem of claim 10 wherein the display system controller further comprises a single board computer for receiving presentation requests from the host computer and performing the scheduling of these requests, a plurality of interfaces for connection to the digital mass storage subsystem, a second plurality of interfaces for connection to the digital audio distribution unit, a third plurality of interfaces for connection to the digital video distribution unit, a plurality of single board computers for supervisory control for monitoring the loading of the display systems controller.

13. The digital audio video display subsystem of claim 10 wherein the digital video distribution unit further comprises a single board computer, an interface card, a floppy disc drive, a floppy disc drive controller and two digital video expander units for reading the compressed video data and producing expanded video frames in RGB format.

14. The digital audio video display subsystem of claim 10, wherein the digital audio distribution system further comprises a single board computer, a parallel interface card, a small computer system (SCSI) interface card, a floppy disc drive, a floppy disc drive controller, and a plurality of audio playback boards, each of which contains a digital signal processor, for converting the digital audio data into baseband audio.

15. The digital audio video display subsystem of claim 10 wherein the scheduler control unit further comprises an RGB switch, an encoder for converting RGB signals to a standard television transmission and playback format, and an address inserter for placing identifying information onto the vertical blanking interval of the video frame.

16. The address inserter of claim 15, wherein the identifying information comprises the address of the frame store unit to which the video frame will be sent and an audio receiver tuning code.

* * * * *